(12) United States Patent
Yeh et al.

(10) Patent No.: US 10,823,993 B2
(45) Date of Patent: Nov. 3, 2020

(54) DISPLAY DEVICE

(71) Applicant: Coretronic Corporation, Hsin-Chu (TW)

(72) Inventors: Chun-Neng Yeh, Hsin-Chu (TW); Kuo-Lung Lin, Hsin-Chu (TW); Yi-Wen Lin, Hsin-Chu (TW); Chiao-Chih Yang, Hsin-Chu (TW); Huei-Tzu Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 168 days.

(21) Appl. No.: 15/469,583

(22) Filed: Mar. 27, 2017

(65) Prior Publication Data
US 2017/0293177 A1    Oct. 12, 2017

(30) Foreign Application Priority Data
Apr. 8, 2016    (TW) .............................. 105204795 U

(51) Int. Cl.
G02F 1/1333    (2006.01)

(52) U.S. Cl.
CPC .. G02F 1/133308 (2013.01); G02F 1/133385 (2013.01); *G02F 2001/133311* (2013.01); *G02F 2001/133314* (2013.01); *G02F 2001/133331* (2013.01)

(58) Field of Classification Search
CPC ......... G02F 1/133308; G02F 1/133385; G02F 2001/133311; G02F 2001/133314; G02F 2001/133331; G02F 2001/133317; G02F 2001/133328

USPC ........................................................ 359/509
See application file for complete search history.

(56) References Cited

U.S. PATENT DOCUMENTS

| | | | |
|---|---|---|---|
| 7,667,964 B2 * | 2/2010 | Kang ................ | G02F 1/133308 361/692 |
| 7,956,979 B2 * | 6/2011 | Oh .................... | G02F 1/133385 349/161 |
| 2007/0146989 A1 | 6/2007 | Su | |
| 2013/0222754 A1 * | 8/2013 | Kohtoku ........... | G02F 1/133603 349/161 |

(Continued)

FOREIGN PATENT DOCUMENTS

TW    200838408    9/2008

*Primary Examiner* — Stephone B Allen
*Assistant Examiner* — Rahman Abdur
(74) *Attorney, Agent, or Firm* — JCIPRNET

(57) ABSTRACT

A display device includes an outer frame, a transparent cover, a back cover, a display module, and a separating structure. The outer frame has a display opening, the transparent cover covers the display opening, and the back cover is opposite to the display opening. The display module is disposed inside the outer frame and has a front surface facing the transparent cover and a rear surface facing the back cover. The separating structure is connected between the back cover and the rear surface of the display module. A first space formed between at least the transparent cover, the front surface of the display module, the outer frame, the back cover, and the separating structure is an enclosed space. A second space formed between at least the rear surface of the display module, the separating structure, and the back cover is connected to an outside and surrounded by the first space.

15 Claims, 3 Drawing Sheets

(56) References Cited

U.S. PATENT DOCUMENTS

2015/0253612 A1\* 9/2015 Hasegawa ......... G02F 1/133308
  349/58
2016/0085111 A1\* 3/2016 Arita ................. G02F 1/133308
  349/58

\* cited by examiner

DISPLAY DEVICE

CROSS-REFERENCE TO RELATED APPLICATION

This application claims the priority benefit of Taiwan application serial no. 105204795, filed on Apr. 8, 2016. The entirety of the above-mentioned patent application is hereby incorporated by reference herein and made a part of this specification.

BACKGROUND OF THE INVENTION

Field of the Invention

The invention relates to a display device, and more particularly, to a display device having waterproof function.

Description of Related Art

As the electronics industry becomes increasingly developed, the flat panel display has gradually replaced the cathode ray tube display and become the current mainstream. Among flat panel displays, liquid crystal display (LCD) technology is more developed and popular. In addition to being applied in a portable electronic device such as a notebook computer, a tablet PC, or a smart phone, the liquid crystal display may also be applied in outdoor display equipment.

In terms of applications of the liquid crystal display in outdoor display equipment, to prevent outside water from entering the inside thereof and causing damage to the components, an additional external waterproof structure is needed. However, equipment cost and size are increased as a result. Moreover, the additional external waterproof structure reduces the cooling effect of the display equipment and makes the dissipation of fog in the display equipment difficult.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention provides a display device having the advantages of waterproofing, equipment cost reduction, equipment size reduction, increased cooling effect, and efficient fog discharge.

Other objects and advantages of the invention may be further illustrated by the technical features disclosed by the invention.

To achieve at least one, some, or all of the objects above or other objects, the display device of embodiment of the invention includes an outer frame, a transparent cover, a back cover, a display module, and a separating structure. The outer frame has a display opening, the transparent cover is connected to the outer frame and covers the display opening, and the back cover is connected to the outer frame and opposite to the display opening. The display module is disposed inside the outer frame and has a front surface and a rear surface opposite to each other, the front surface faces the transparent cover, and the rear surface faces the back cover. The separating structure is connected between the back cover and the rear surface of the display module and separates a first space and a second space. The first space is formed at least between the transparent cover, the front surface of the display module, the outer frame, the back cover, and the separating structure. The second space is at least formed between the rear surface of the display module, the separating structure, and the back cover. The first space is an enclosed space, the second space is connected to the outside, and the first space surrounds the second space.

Based on the above, the separating structure of embodiment of the invention separates the inside of the display device into a first space and a second space. The first space is an enclosed space and has waterproofing and dustproofing effects, the front surface (i.e., display surface) of the display module is located inside the first space, and an electronic element such as a circuit board, a wire, a connector, or a speaker may be disposed inside the first space so as to prevent damage to the front surface of the display module and the electronic element from contact with outside water and dust. The second space is connected to the outside and readily discharges heat generated during the operation of the display device and water inside the display device. Since the display device of embodiment of the invention is waterproof via the enclosed first space thereof as described above, an additional external waterproof structure is not needed, and therefore equipment cost may be lowered and equipment size may be reduced. Moreover, since the display device of embodiment of the invention does not need an additional external waterproof structure as described above, reduction in the cooling effect of the display device due to the external waterproof structure may be prevented, and difficult dissipation of fog in the display device due to the external waterproof structure may be prevented.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
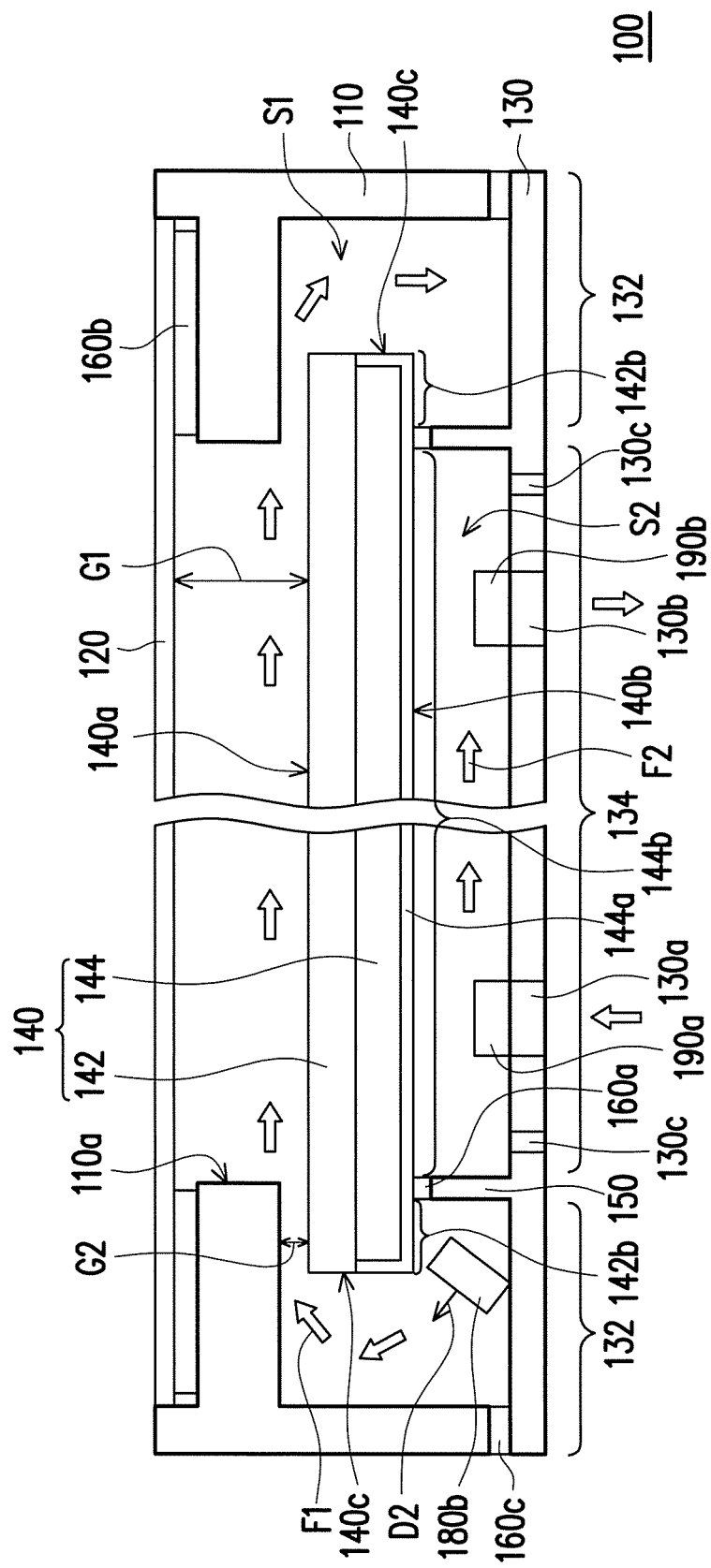
FIG. 1 is a cross-sectional schematic of a display device of an embodiment of the invention.
Figure 2:
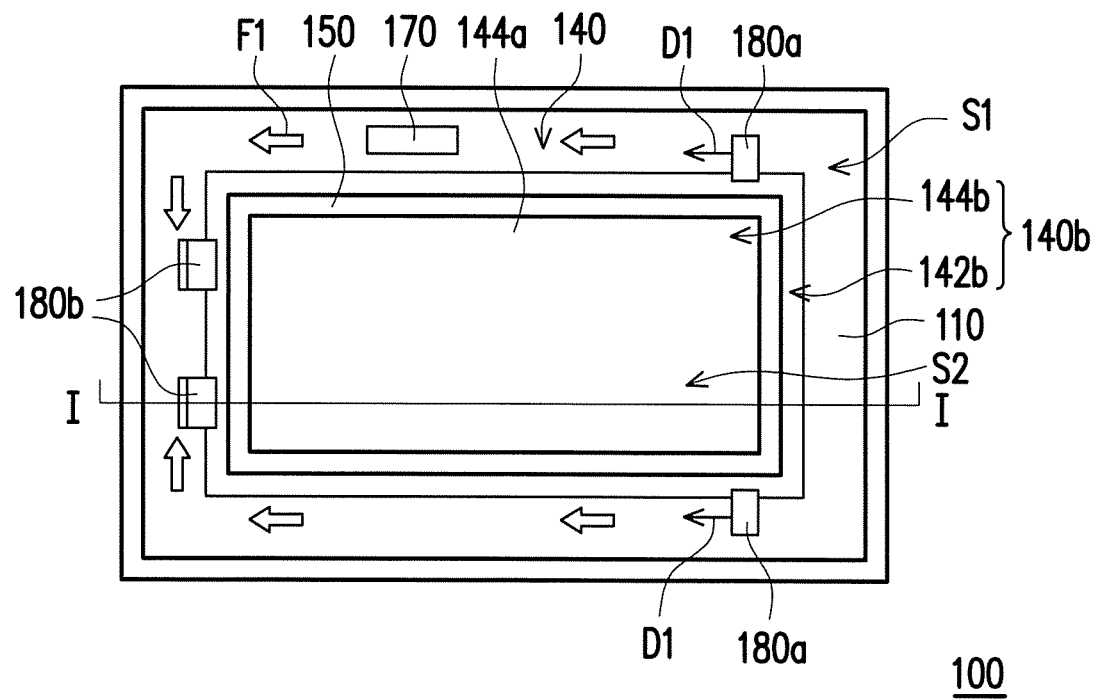
FIG. 2 is a partial structural bottom view of the display device of FIG. 1.

FIG. 1 is a cross-sectional schematic of a display device of an embodiment of the invention. FIG. 2 is a partial structural bottom view of the display device of FIG. 1. FIG. 1 corresponds to the section line I-I of FIG. 2. To clarify the figures, a back cover 130, an air inlet 130a, an air outlet 130b, a water outlet 130c, and fans 190a and 190b are not shown in FIG. 2. Referring to FIG. 1 and FIG. 2, a display device 100 of the embodiment includes an outer frame 110, a transparent cover 120, a back cover 130, and a display module 140. The outer frame 110 has a display opening 110a, the transparent cover 120 is connected to the outer frame 110 and covers the display opening 110a, and the back cover 130 is connected to the outer frame 110 and opposite to the display opening 110a. The display module 140 is disposed inside the outer frame 110 and has a front surface 140a and a rear surface 140b opposite to each other, the front surface 140a faces the transparent cover 120, and the rear surface 140b faces the back cover 130.

The display module 140 of the embodiment includes a display panel 142 and a backlight module 144, and the display panel 142 is stacked on top of backlight module 144. The display panel 142 is, for instance, but not limited to, a liquid crystal display panel, and the backlight module 144 is, for instance, but not limited to, a direct-type backlight module. The front surface 140a of the display module 140 is the display surface of the display panel 142 configured to display an image, and the display surface is exposed by the display opening 110a and protected by the transparent cover 120. The rear surface 140b of the display module 140 is the back surface of the back cover 144a of the backlight module 144.

The display device 100 further includes a separating structure 150. The separating structure 150 is, for instance, a frame and is connected between the back cover 130 and the rear surface 140b of the display module 140, and separates a first space S1 and a second space S2 on the inside of the display device 100. The first space S1 is formed at least between the transparent cover 120, the front surface 140a of the display module 140, the outer frame 110, the back cover 130, and the separating structure 150. The second space S2 is formed at least between the rear surface 140b of the display module 140, the separating structure 150, and the back cover 130, and is surrounded by the first space S1. In the embodiment, the separating structure 150 and the back cover 130 are, for instance, integrally formed. However, the invention is not limited thereto, and in other embodiments, the separating structure 150 and the back cover 130 may be not integrally formed.

The back cover 130 of the embodiment includes a central portion 134 and a surrounding portion 132, the central portion 134 corresponds to the second space S2, and the surrounding portion 132 surrounds the central portion 134 and corresponds to the first space S1. Moreover, the rear surface 140b of the display module 140 of the embodiment includes a central region 144b and a surrounding region 142b, the central region 144b corresponds to the second space S2, and the surrounding region 142b surrounds the central region 144b and corresponds to the first space S1. That is, the first space S1 is formed between the transparent cover 120, the front surface 140a of the display module 140, the side surface 140c of the display module 140, the outer frame 110, the surrounding portion 132 of the back cover 130, the separating structure 150, and the surrounding region 142b of the rear surface 140b of the display module 140. The second space S2 is formed between the central region 144b of the rear surface 140b of the display module 140, the separating structure 150, and the central portion 134 of the back cover 130.

The display device 100 of the embodiment further includes at least one electronic element 170 disposed inside the first space S1, as shown in FIG. 2. FIG. 2 only schematically shows the electronic element 170, and in actuality, the quantity of the electronic element 170 may be a plurality and may respectively be a component such as a circuit board, a wire, a connector, or a speaker. Based on the above, the display device 100 of the embodiment further includes waterproof materials 160a, 160b, and 160c as shown in FIG. 1. The waterproof material 160a is disposed between the rear surface 140b of the display module 140 and the separating structure 150, the waterproof material 160b is disposed between the transparent cover 120 and the outer frame 110, and the waterproof material 160c is disposed between the outer frame 110 and the back cover 130 so as to make the first space S1 form an enclosed space and have waterproof effect, and also to have dustproof effect. Accordingly, the front surface 140a (i.e., display surface) of the display module 140 and the electronic device 170 are located inside the enclosed first space S1, and damage from contact with outside water may be prevented. The material of the waterproof materials 160a, 160b, and 160c is, for instance, rubber, silica gel, foam, or other suitable types of elastic waterproof material, and the invention is not limited thereto. Moreover, the outer frame 110 and the back cover 130 or the rear surface 140b of the display module 140 and the separating structure 150 may be fixed by a screw (not shown) to compress the waterproof materials 160a and 160c, wherein the waterproof materials 160a and 160c are, for instance, installed outside the screw, so as to increase the adhesiveness between each element, so as to further enhance the waterproofing effect, and the first space S1 and the second space S2 may also be effectively separated.

The display device 100 of the embodiment may be disposed, for instance, outdoors, and since the display device 100 of the embodiment is waterproof via the enclosed first space S1 thereof as described above, an additional external waterproof structure is not needed, and therefore equipment cost may be lowered and equipment size may be reduced. Moreover, since the display device 100 of the embodiment does not need an additional external waterproof structure, reduction in the cooling effect of the display device 100 due to the external waterproof structure may be prevented, and difficult dissipation of the fog in the display device 100 due to the external waterproof structure may be prevented.

In the embodiment, the display device further includes fans 180a (two is exemplarily shown) and 180b (two is exemplarily shown). The fans 180a and 180b are disposed inside the first space S1 and are suitable for providing a circulating airstream F1, and the circulating airstream F1 circulates inside the first space S1 and passes through a gap G1 between the transparent cover 120 and the front surface 140a of the display module 140, so as to disperse the fog between the transparent cover 120 and the front surface 140a of the display module 140.

The fans 180a and 180b are disposed between the surrounding region 142b of the rear surface 140b of the display module 140, the separating structure 150, the back cover 130, and the outer frame 110. An outflow direction D1 of the fan 180a is parallel to the rear surface 140b of the display module 140 to drive the circulating airstream F1 to flow toward the fan 180b along the separating structure 150. An outflow direction D2 of the fan 180b is inclined to the rear surface 140b of the display module 140 as shown in FIG. 1 to drive the circulating airstream F1 to flow from the rear surface 140b of the display module 140 to the front surface 140a of the display module 140 and flow toward the gap G1 between the transparent cover 120 and the front surface 140a of the display module 140 via a gap G2 between the front surface 140a of the display module 140 and the outer frame 110.

The circulating airstream F1 generated by the fans 180a and 180b also has a cooling effect to the display panel 142. Specifically, in the display surface of the display panel 140 shown in FIG. 1, when heat generated in the first space S1 reaches the surrounding region 142b of the rear surface 140b of the display module 140 with the circulating airstream F1, the heat is transmitted to the central region 144b of the rear surface 140b of the display module 140 via the back cover 144a of the backlight module 144, wherein the back cover 144a is, for instance, a material having high thermal conductivity, such as a metal, so as to rapidly transmit the heat from the surrounding region 142b to the central region 144b, and then the heat is transmitted to the outside from the second space S2, as described below.

Figure 3:
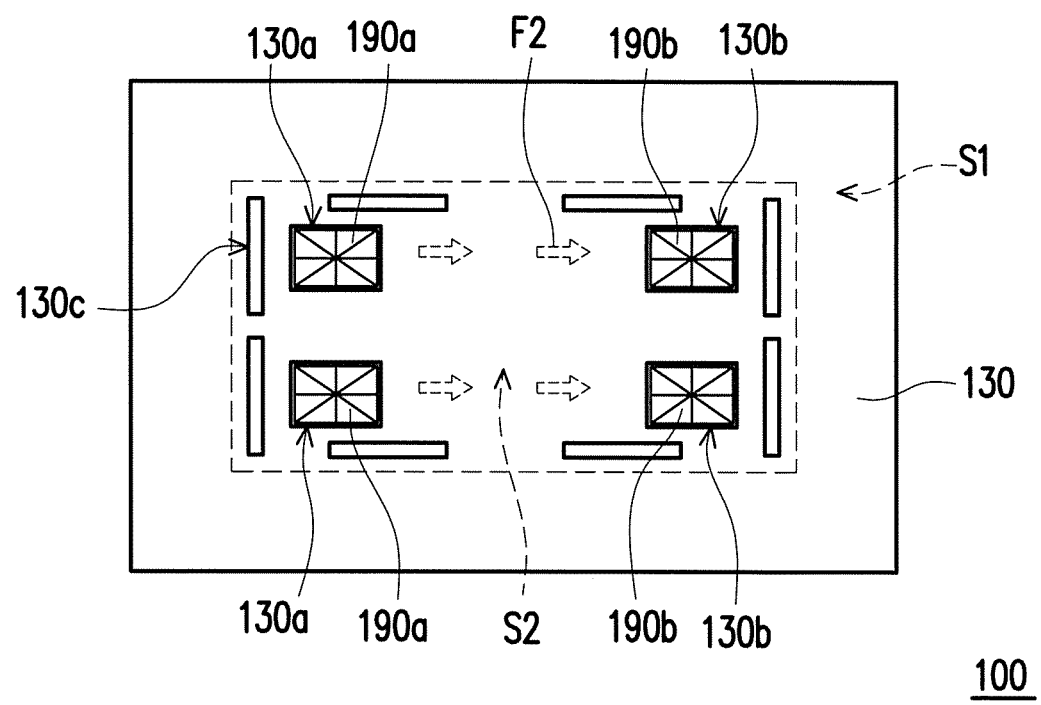
FIG. 3 is a bottom view of the display device of FIG. 1.

FIG. 3 is a bottom view of the display device of FIG. 1. Referring to FIG. 3, the back cover 130 of the embodiment has at least one air inlet 130a (two is exemplarily shown) and at least one air outlet 130b (two is exemplarily shown), and the second space S2 is connected to the outside via the at least one air inlet 130a and the at least one air outlet 130b. The display device 100 further includes fans 190a (two is exemplarily shown) and 190b (two is exemplarily shown), and the fans 190a and 190b are disposed inside the second space S2 and are respectively aligned to the air inlet 130a and the air outlet 130b. The fans 190a and 190b are suitable for providing a cooling airstream F2, wherein the fan 190a sucks cold air from the outside to inside of the second space S2, and the fan 190b extracts hot air inside the second space S2 to the outside, such that the cooling airstream F2 enters the second space S2 from the outside via the air inlet 130a and reaches the outside from the second space S2 via the air outlet 130b. Accordingly, after the heat generated by the display surface of the display panel 140 is transmitted from the first space S1 to the second space S2 via the back cover 144a as described above, the heat may be transmitted to the outside with the cooling airstream F2. Moreover, when the backlight module 144 is, for instance, a direct-type backlight module, a plurality of light sources (not shown) is disposed on the back cover 144a, wherein high temperature is generated when the light sources operate, and therefore the cooling airstream F2 may also effectively perform cooling on the high temperature generated at the back cover 144a during the operation of the backlight module 144.

Referring to FIG. 3, in the embodiment, the back cover 130 further has at least one water outlet 130c (eight is exemplarily shown), and the second space S2 is connected to the outside via the at least one water outlet 130c. Accordingly, water accumulated inside the display device 100 due to rainfall or other factors may be discharged via the water outlet 130c. In other embodiments, the fan inside the second space may be not aligned to the air inlet or the air outlet, and a fan may be not disposed inside the second space, and the back cover may also not have a water outlet, as described below via figures.

Figure 4:
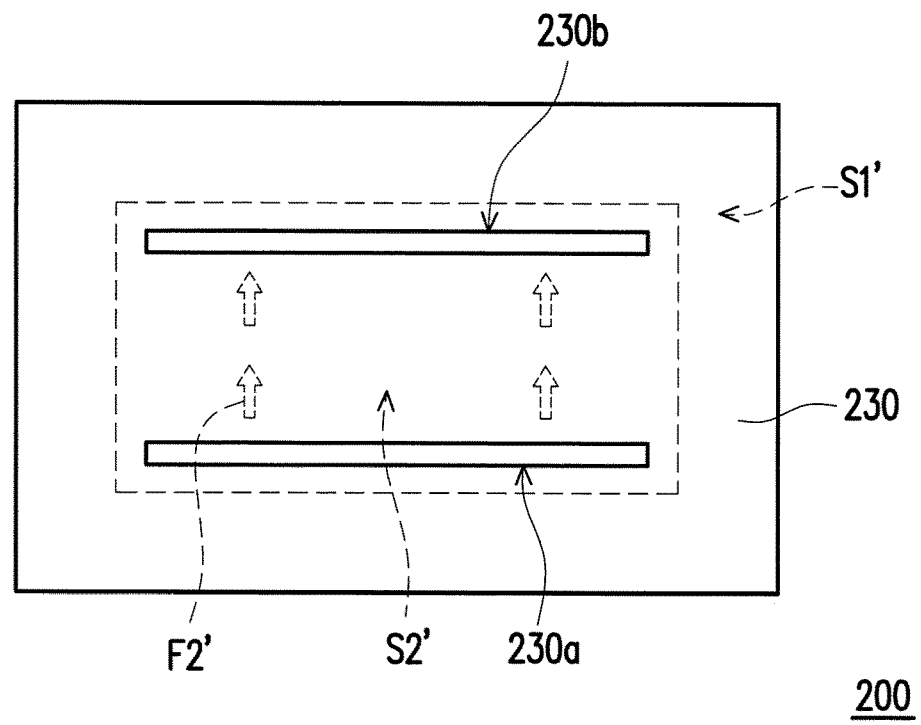
FIG. 4 is a bottom view of a display device of another embodiment of the invention.

FIG. 4 is a bottom view of a display device of another embodiment of the invention. In a display device 200 of FIG. 4, the location and the mode of operation of a first space S1' and a second space S2' are similar to the location and the mode of operation of the first space S1 and the second space S2 of FIG. 1 to FIG. 3 and are not repeated herein. The difference between the display device 200 and the display device 100 is that, the second space S2' of the display device 200 does not have the fans 190a and 190b shown in FIG. 3, the display device 200 generates a cooling airstream F2' via natural convection, the cooling airstream F2' enters the second space S2' from the outside via an air inlet 230a of a back cover 230 and reaches the outside from the second space S2' via an air outlet 230b of the back cover 230. Moreover, the back cover 230 does not have the water outlet 130c shown in FIG. 3, and water accumulated inside the display device 200 due to rainfall or other factors is discharged via the air inlet 230a and the air outlet 230b.

Figure 5:
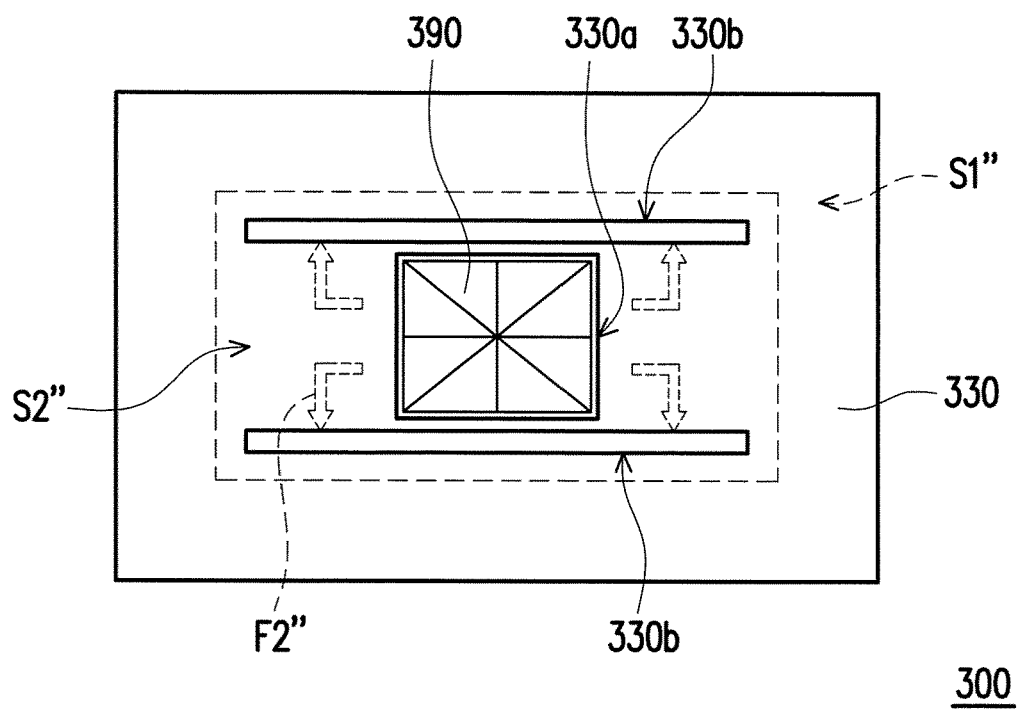
FIG. 5 is a bottom view of a display device of another embodiment of the invention.

FIG. 5 is a bottom view of a display device of another embodiment of the invention. In a display device 300 of FIG. 5, the location and the mode of operation of a first space S1" and a second space S2" are similar to the location and the mode of operation of the first space S1' and the second space S2' of FIG. 4 and are not repeated herein. The difference between the display device 300 and the display device 200 is that, the second space S2" of the display device 300 has a fan 390, and the fan 390 is aligned to an air inlet 330a of a back cover 330 and misaligned to an air outlet 330b (two is exemplarily shown) of the back cover 330. The display device 300 generates a cooling airstream F2" via the fan 390, wherein the fan 390 sucks cold air from the outside to inside of the second space S2", such that the cooling airstream F2" enters the second space S2" from the outside via the air inlet 330a and reaches the outside from the second space S2" via the air outlet 330b. In other embodiments, the fan 390 may be aligned to the air outlet 330b and misaligned to the air inlet 330a instead and extracts air inside the second space S2" to the outside, and the invention is not limited thereto.

Based on the above, the display devices of the embodiments of the invention have at least one of the following advantages: the separating structure of the embodiment of the invention separates the inside of the display device into a first space and a second space. The first space is an enclosed space and has waterproofing and dustproofing effects, the front surface (i.e., display surface) of the display module is located inside the first space, and an electronic element such as a circuit board, a wire, connector, or a speaker may be disposed inside the first space so as to prevent damage to the front surface of the display module and the electronic element from contact with outside water and dust. The second space is connected to the outside and readily discharges heat generated during the operation of the display device and water inside the display device. Since the display device of the embodiment of the invention is waterproof via the enclosed first space thereof as described above, an additional external waterproof structure is not needed, and therefore equipment cost may be lowered and equipment size may be reduced. Moreover, since the display device of the embodiment of the invention does not need an additional external waterproof structure as described above, reduction in the cooling effect of the display device due to the external waterproof structure may be prevented, and difficult dissipation of fog in the display device due to the external waterproof structure may be prevented.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display device, comprising:
   an outer frame, having a display opening;
   a transparent cover, connected to the outer frame and covering the display opening;
   a back cover, connected to the outer frame and opposite to the display opening;
   a display module, disposed inside the outer frame and having a front surface and a rear surface opposite to each other, wherein the front surface faces the transparent cover and the rear surface faces the back cover, and the transparent cover and the display module are respectively disposed on two opposite sides of the display opening;
   a separating structure, connected between the back cover and the rear surface of the display module and separating a first space and a second space, wherein the first space is formed at least between the transparent cover, the front surface of the display module, the outer frame, the back cover, and the separating structure, the second space is formed at least between the rear surface of the display module, the separating structure, and the back cover, the first space is an enclosed space, the second space is connected to an outside, and the first space surrounds the second space; and
   a waterproof material, wherein the waterproof material is disposed between the rear surface of the display module and the separating structure.

2. The display device of claim 1, wherein the separating structure is a frame.

3. The display device of claim 1, wherein the separating structure and the back cover are integrally formed.

4. The display device of claim 1, wherein the back cover comprises a central portion and a surrounding portion, the central portion corresponds to the second space, and the surrounding portion surrounds the central portion and corresponds to the first space.

5. The display device of claim 1, wherein the rear surface of the display module comprises a central region and a surrounding region, the central region corresponds to the second space, and the surrounding region surrounds the central region and corresponds to the first space.

6. The display device of claim 1, wherein the waterproof material is further disposed between the transparent cover and the outer frame.

7. The display device of claim 1, further comprising at least one fan, wherein the at least one fan is disposed inside the first space and is suitable for providing a circulating airstream, the circulating airstream circulates inside the first space and passes through a gap between the transparent cover and the front surface of the display module.

8. The display device of claim 7, wherein the at least one fan is disposed between the rear surface of the display module, the separating structure, the back cover, and the outer frame, and an outflow direction of the at least one fan is inclined to the rear surface of the display module to drive the circulating airstream to flow from the rear surface of the display module to the front surface of the display module.

9. The display device of claim 7, wherein the at least one fan is disposed between the rear surface of the display module, the separating structure, the back cover, and the outer frame, and an outflow direction of the at least one fan is parallel to the rear surface of the display module to drive the circulating airstream to flow along the separating structure.

10. The display device of claim 1, wherein the back cover has at least one air inlet and at least one air outlet, and the second space is connected to the outside via the at least one air inlet and the at least one air outlet.

11. The display device of claim 10, further comprising at least one fan, wherein the at least one fan is disposed inside the second space and is suitable for providing a cooling airstream, the cooling airstream enters the second space from the outside via the air inlet and reaches the outside from the second space via the air outlet.

12. The display device of claim 11, wherein the at least one fan is aligned to the at least one air inlet or the at least one air outlet.

13. The display device of claim 11, wherein the at least one fan is misaligned to the at least one air inlet or the at least one air outlet.

14. The display device of claim 1, wherein the back cover has at least one water outlet and the second space is connected to the outside via the at least one water outlet.

15. The display device of claim 1, further comprising at least one electronic element, wherein the electronic element is disposed inside the first space.

\* \* \* \* \*